United States Patent
Hellestam

(10) Patent No.: US 10,786,865 B2
(45) Date of Patent: Sep. 29, 2020

(54) METHOD FOR ADDITIVE MANUFACTURING

(71) Applicant: ARCAM AB, Moelndal (SE)

(72) Inventor: Calle Hellestam, Geoteborg (SE)

(73) Assignee: Arcam AB, Moelndal (SE)

(*) Notice: Subject to any disclaimer, the term of this patent is extended or adjusted under 35 U.S.C. 154(b) by 787 days.

(21) Appl. No.: 14/950,626

(22) Filed: Nov. 24, 2015

(65) Prior Publication Data

US 2016/0167160 A1 Jun. 16, 2016

Related U.S. Application Data

(60) Provisional application No. 62/235,934, filed on Oct. 1, 2015, provisional application No. 62/091,990, filed on Dec. 15, 2014.

(51) Int. Cl.
*B23K 15/00* (2006.01)
*B29C 64/153* (2017.01)
(Continued)

(52) U.S. Cl.
CPC ........ *B23K 15/0086* (2013.01); *B22F 3/1055* (2013.01); *B23K 15/02* (2013.01);
(Continued)

(58) Field of Classification Search
CPC .. B23K 15/0086; B23K 15/02; B23K 26/144; B23K 26/342; B29C 64/153;
(Continued)

(56) References Cited

U.S. PATENT DOCUMENTS 2,264,968 A  12/1941  De Forest
2,323,715 A   7/1943  Kuehni
(Continued)

FOREIGN PATENT DOCUMENTS

CA    2860188 A1    6/2006
CN  101607311 A   12/2009
(Continued)

OTHER PUBLICATIONS

Gibson, D.W., et al., "Additive Manufacturing Technologies: Rapid Prototyping to Direct Digital Manufacturing", 2010, pp. 126-129, Springer, New York.
(Continued)

*Primary Examiner* — Thorl Chea
(74) *Attorney, Agent, or Firm* — Dinsmore & Shohl LLP

(57) ABSTRACT

A method for forming at least one three-dimensional article through successive fusion of parts of a powder bed, comprising the steps of: providing at least one model of said three-dimensional article, moving a support structure in z-direction at a predetermined speed while rotating said support structure at a predetermined speed, directing a first and second energy beam causing said powder layer to fuse in first and second selected locations according to said model, wherein a first cover area of said first energy beam on said powder layer is arranged at a predetermined minimum distance and non-overlapping from a second cover area of said second energy beam on said powder layer, a trajectory of said first cover area and a trajectory of said second cover area are at least one of overlapping each other, abutting each other or separated to each other when said support structure is rotated a full lap.

14 Claims, 7 Drawing Sheets

(51) Int. Cl.
*B33Y 30/00* (2015.01)
*B22F 3/105* (2006.01)
*B23K 26/144* (2014.01)
*B23K 26/342* (2014.01)
*B28B 1/00* (2006.01)
*B23K 15/02* (2006.01)
*B33Y 10/00* (2015.01)
*B33Y 50/02* (2015.01)
*B29K 105/00* (2006.01)

(52) U.S. Cl.
CPC .......... *B23K 26/144* (2015.10); *B23K 26/342* (2015.10); *B28B 1/001* (2013.01); *B29C 64/153* (2017.08); *B33Y 30/00* (2014.12); *B22F 2003/1056* (2013.01); *B29K 2105/251* (2013.01); *B33Y 10/00* (2014.12); *B33Y 50/02* (2014.12); *Y02P 10/295* (2015.11)

(58) Field of Classification Search
CPC ......... B33Y 30/00; B33Y 10/00; B33Y 50/02; B22F 3/1055; B22F 2003/1056; B28B 1/001; B29K 2105/251
See application file for complete search history.

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 5,985,204 A | 11/1999 | Otsuka et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0014457 A1 | 1/2008 | Gennaro et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |

(56) References Cited

U.S. PATENT DOCUMENTS

| | | |
|---|---|---|
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0263209 A1 | 9/2014 | Burris et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1* | 11/2014 | Ljungblad ............ B22F 3/1055 419/53 |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Lungblad et al. |
| 2016/0129501 A1 | 5/2016 | Loewgren et al. |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| EP | 2878409 A1 | 6/2015 |
| EP | 3233336 B1 | 9/2018 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | WO 1993/08928 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |

(56) References Cited

FOREIGN PATENT DOCUMENTS

| WO | WO 2008/125497 A1 | 10/2008 |
| --- | --- | --- |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | 2014107679 A1 | 7/2014 |
| WO | 2014187606 A1 | 11/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |
| WO | 2016096438 A1 | 6/2016 |

OTHER PUBLICATIONS

Motojima, Seiji, et al., "Chemical Vapor Growth Of LaB6 Whiskers And Crystals Having A Sharp Tip", Journal Of Crystal Growth, vol. 44, No. 1, Aug. 1, 1978 (Aug. 1, 1978), pp. 106-109.

Klassen, Alexander, et al., "Modelling of Electron Beam Absorption in Complex Geometries", *Journal Of Physics D: Applied Physics*, January 15, 2014, 12 pages, vol. 47, No. 6, Institute Of Physics Publishing Ltd., Great Britain.

International Searching Authority, International Search Report and Written Opinion for International Application No. PCT/EP2015/078215, dated Feb. 22, 2016, 9 pages, European Patent Office, Netherlands.

International Preliminary Examining Authority, Written Opinion (second) for International Application No. PCT/EP2015/078215, dated Dec. 13, 2016, 6 pages, Netherlands.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction Of Delaunay And Voronoi Diagrams", Algorithmica, Jun. 1992, pp. 381-413, vol. 7, Issue 1-6, Springer-Verlag, New York.

Weigel, Th., et al., "Design And Preparation Of Polymeric Scaffolds For Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Hauser, C. et al, "Transformation algorithms for image preparation in spiral growth manufacturing (SGM)", Rapid Prototyping Journal, 2008, pp. 188-196, vol. 14, No. 4, Emerald Group Publishing Limited, West Yorkshire, England.

Wikipedia, "Circle", Wikipedia the Free Encyclopedia, May 13, 2019 at 23:50 (UTC), retrieved from https://en.wikipedia.org/wiki/2/indes.php?title=Circle&oldid=896970671. (13 pages) (as cited in EP Notice of Opposition).

Claim Set filed Dec. 16, 2016 from European Patent EP3233336 (EP Application No. 15807833.7 filed Dec. 2, 2015) (8 pages).

Claim Set filed Nov. 28, 2017 from European Patent EP3233336 (EP Application No. 15807833.7 filed Dec. 2, 2015) (7 pages).

Certified Copy of U.S. Appl. No. 62/091,990 filed Dec. 15, 2014 (ARCAM AB) (54 pages).

Certified Copy of U.S. Appl. 62/235,934 filed Oct. 1, 2015 (ARCAM AB) (50 pages).

Certified Copy of International Application PCT/EP20151078215 filed Dec. 1, 2015 (ARCAM AB) (45 pages).

Certified Copy of U.S. Appl. No. 14/950,626 filed Nov. 24, 2015 (ARCAM AB) (56 pages).

Certified Copy of U.S. Appl. No. 14/950,714 filed Nov. 24, 2015 (ARCAM AB) (56 pages).

Meier, Frank, Opponent in European Notice of Opposition filed Jun. 3, 2019 in European Patent EP3233336 (EP Application No. 15807833.7 filed Dec. 2, 2015) (35 pages).

ARCAM AB, Proprietor Reply to Notice of Opposition filed Dec. 20, 2019 in European Patent EP3233336 (EP Application No. 15807833.7 filed Dec. 2, 2015) (5 pages).

English Translation of Japanese Notice of Reasons for Rejection dated Dec. 3, 2019 in JP Patent Application JP2017-530087 filed Dec. 2, 2015 (3 pages).

\* cited by examiner

METHOD FOR ADDITIVE MANUFACTURING

CROSS-REFERENCE TO RELATED APPLICATIONS

This application claims priority to and the benefit of U.S. Provisional Patent Application Ser. No. 62/091,990, filed Dec. 15, 2014, and U.S. Provisional Patent Application Ser. No. 62/235,934, filed Oct. 1, 2015; the contents of both of which as are hereby incorporated by reference in their entirety.

BACKGROUND

Technical Field

The present invention relates to an improved method for additively manufacturing large 3-dimensional object.

Related Art

Freeform fabrication or additive manufacturing is a method for forming three-dimensional articles through successive fusion of chosen parts of powder layers applied to a work plate. A method and apparatus according to this technique is disclosed in U.S. Pat. No. 8,021,138.

Such an apparatus may comprise a work plate on which the three-dimensional article is to be formed, a powder dispenser, arranged to lay down a thin layer of powder on the work plate for the formation of a powder bed, a laser beam source for delivering energy to the powder whereby fusion of the powder takes place, elements for control of the laser beam source over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

There is a demand for additive manufacturing techniques which are capable of building three-dimensional articles of larger and larger sizes at a faster and faster speed of manufacture at the same time as improving the material characteristics of the final article.

BRIEF SUMMARY

An object of the present invention is to provide an additive manufacturing apparatus and method suitable for continuous additive manufacturing of three-dimensional parts which is capable of efficiently building larger parts than prior art machines without sacrificing material properties of the final product.

In a first aspect according to various embodiments of the invention it is provided a method for forming at least one three-dimensional article through successive fusion of parts of a powder bed, which parts correspond to successive portions of the three-dimensional article, the method comprising the steps of, providing at least one model of the three-dimensional article, moving a support structure in z-direction at a predetermined speed while rotating the support structure at a predetermined speed, applying a powder layer on the support structure, directing a first energy beam from a first energy beam source at a first selected location of the powder layer and a second energy beam from a second energy beam source at a second selected location, the first and second energy beam sources causing the powder layer to fuse in the first and second selected locations according to the model to form a first and second portions of the three-dimensional article; and providing a first portion of the powder layer simultaneous as fusing a second portion of the powder layer, wherein a first cover area, being smaller than an area of the support structure, of the first energy beam on the powder layer is arranged at a predetermined minimum distance and non-overlapping from a second cover area, being smaller than an area of the support structure, of the second energy beam on the powder layer so that a trajectory of the first cover area and a trajectory of the second cover area are overlapping each other when the support structure is rotated a full lap.

An exemplary advantage of at least these embodiments is that additive manufacturing may be performed with multiple energy beams which do not interfere with each other. This allows for a continuous operation of an additive manufacturing process for production of larger objects than the sum of the static cover area of the individual energy beams.

In various example embodiments according to the present invention the minimum predetermined distance is at least half a maximum scan length of the first and/or second energy beam on the powder layer. An exemplary advantage of at least these embodiments is that the first and second electron beam sources are arranged at a predetermined distance from each other so that interference between the sources and the beams may be controlled.

In various example embodiments of the present invention at least one of the first and second beams is scanning along a line perpendicular to the rotational axis of the support structure. An exemplary advantage of at least these embodiments is that hatching perpendicular to the rotational axis is time efficient at the same time as it provides for a number of different hatch patterns and/or scan line sequences.

In various example embodiments according to the present invention the rotational axis of the support structure is along the Z-axis and the at least one beam is fusing in an x-y plane. An exemplary advantage of at least these embodiments is that the manufacturing time of three dimensional articles may be reduced compared to if the support structure is only moving in the Z-axis.

In various example embodiments of the present invention the support structure is a horizontal plate. An exemplary advantage of at least these embodiments is that powder material may be applied by gravitation forces.

In various example embodiments of the present invention at least one of the first and/or second energy beams are provided off axis with respect to the rotational axis of the support structure. An exemplary advantage of at least these embodiments is that the build area may be larger than the sum of the individual beam covering areas.

In various example embodiments of the present invention the support structure is continuously moving in the z-direction at a predetermined speed. An exemplary advantage of at least these embodiments is that manufacturing of three dimensional articles may be performed uninterrupted.

In various example embodiments of the present invention the line perpendicular to the rotational axis is at least one of a straight line or a meandering line. An exemplary advantage of at least these embodiments is that any shape of the scan line may be used.

In various example embodiments of the present invention a rotational axis of the model is coincidental with the rotational axis of the three-dimensional article built on the support structure. An exemplary advantage of at least these embodiments is that the model is adapted to the manufacturing process.

In various example embodiments of the present invention the powder layer is provided continuously on the support structure during the formation of the three-dimensional article. An exemplary advantage of an uninterrupted powder application process is that the powder layer quality may be improved.

In various example embodiments of the present invention the support structure is rotating at least one of clockwise or anticlockwise during the formation of the three-dimensional article. An exemplary advantage of at least these embodiments is that the rotational direction of the support structure may be chosen by the operator. Another advantage is that the rotational direction may be changed one or several times during the formation of the three dimensional article.

In various example embodiment according to the present invention the method further comprising the step of preheating a third portion of the powder layer. An exemplary advantage of at least these embodiments is that the first and/or the second electron beam source may be used when most appropriate for the preheating, i.e. heating and keeping the powder layer to a predetermined temperature range before melting the powder. The third position is laterally separated from the first and second position but within a first maximum beam scan area of the first electron beam or a second maximum beam scan area of the second electron beam. In an alternative embodiment the preheating may be performed by using an energy source not used for fusing the powder layer.

In various example embodiments the first portion of the powder layer is provided simultaneous as fusing the second portion of the powder layer. An exemplary advantage of at least these embodiments is that a fusion step does not have to wait for the powder layer application to be finished which in turn will save a lot of manufacturing time.

In various example embodiments the present invention further comprising the step of switching the first and second electron beams on and off synchronously with each other so that when one of them is off the other one is on and vice versa. An exemplary advantage of at least these embodiments is that the magnetic field from one electron beam source which may affect the other electron beam source is further minimized Another advantage is that repelling forces between simultaneous electron beams on the work table is eliminated.

In a second aspect according to various embodiments of the invention it is provided a program element configured and arranged when executed on a computer to implement a method for forming at least one three-dimensional article through successive fusion of parts of a powder bed, which parts correspond to successive portions of the three-dimensional article, the method comprising the step of: providing at least one model of the three-dimensional article, moving a support structure in a Z-direction at a predetermined speed and rotating the support structure about a Z-axis at a predetermined speed, applying a powder layer on the support structure, and directing a first energy beam from a first energy beam source at a first selected location of the powder layer and a second energy beam from a second energy beam source at a second selected location, the first and second energy beam sources being at least one of an electromagnetic energy beam source or a charged particle beam source, causing the powder layer to fuse in the first and second selected locations according to the model to form a first and second portions of the three-dimensional article, wherein: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, and a trajectory of the first cover area and a trajectory of the second cover area are at least one of overlapping each other, abutting each other, or separated relative to each other when the support structure is rotated a full lap.

According to various embodiments provided is a non-transitory computer readable medium having stored thereon the program element described above.

According to a further aspect of various embodiments there is provided a computer program product comprising at least one non-transitory computer-readable storage medium having computer-readable program code portions embodied therein. The computer-readable program code portions comprise: an executable portion configured for, upon receipt of at least one model of the three-dimensional article, applying a powder layer on a support structure; an executable portion configured for moving a support structure in z-direction at a predetermined speed and rotating the support structure about a z-axis at a predetermined speed; and an executable portion configured for directing a first energy beam from a first energy beam source at a first selected location of the powder layer and a second energy beam from a second energy beam source at a second selected location, the first and second energy beam sources being at least one of an electromagnetic energy beam source or a charged particle beam source, causing the powder layer to fuse in the first and second selected locations according to the model to form a first and second portions of the three-dimensional article. At least one of the executable portions is further configured such that: a first portion of the powder layer is applied simultaneously with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, and a trajectory of the first cover area and a trajectory of the second cover area are at least one of overlapping each other, abutting each other, or separated relative to each other when the support structure is rotated a full lap.

Also provided according to various embodiments is an apparatus for forming a three-dimensional article through successive fusion of parts of a powder bed, which parts corresponds to successive cross sections of the three-dimensional article, the apparatus comprising: a control unit having stored thereon a computer model of the three-dimensional article; a support structure movable in a z-direction at a predetermined speed and rotatable about a z-axis at a predetermined speed, a powder layer applicator for applying a powder layer on the support structure, and first and second energy beam sources arranged for at least one of heating or fusing the powder layer at first and second selected locations respectively according to the model to form first and second portions of the three-dimensional article, wherein: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, and a trajectory of the first cover area and a trajectory of the second cover area are at least one of overlapping each other, abutting each other, or separated relative to each other when the support structure is rotated a full lap.

Also provided according to various embodiments is a method for forming at least one three-dimensional article through successive fusion of parts of a powder bed, which parts correspond to successive portions of the three-dimensional article. The method comprises the steps of: providing at least one model of the three-dimensional article, moving a support structure in a Z-direction at a predetermined speed while also rotating the support structure about a Z-axis at a predetermined speed, applying a powder layer on the support structure, and directing a first energy beam from a first energy beam source at a first selected location of the powder layer and a second energy beam from a second energy beam source at a second selected location, the first and second energy beam sources causing the powder layer to fuse in the first and second selected locations according to the model to form respective first and second portions of the three-dimensional article, wherein: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, the powder layer is fully covered by the first and second cover areas, and a trajectory of the first cover area and a trajectory of the second cover area are at least in part overlapping each other when the support structure is rotated a full lap.

In yet another aspect according to various embodiments of the invention it is provided a program element configured and arranged when executed on a computer to implement a method for forming at least one three-dimensional article through successive fusion of parts of a powder bed, which parts correspond to successive portions of the three-dimensional article, the method comprising the step of: providing at least one model of the three-dimensional article, moving a support structure in a Z-direction at a predetermined speed and rotating the support structure about a Z-axis at a predetermined speed, applying a powder layer on the support structure, and directing a first energy beam from a first energy beam source at a first selected location of the powder layer and a second energy beam from a second energy beam source at a second selected location, the first and second energy beam sources being at least one of an electromagnetic energy beam source or a charged particle beam source, causing the powder layer to fuse in the first and second selected locations according to the model to form a first and second portions of the three-dimensional article, wherein: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, the powder layer is fully covered by the first and second cover areas, and a trajectory of the first cover area and a trajectory of the second cover area are at least in part overlapping each other when the support structure is rotated a full lap.

According to various embodiments provided is a non-transitory computer readable medium having stored thereon the program element described above.

According to a further aspect of various embodiments there is provided a computer program product comprising at least one non-transitory computer-readable storage medium having computer-readable program code portions embodied therein. The computer-readable program code portions comprise: an executable portion configured for, upon receipt of at least one model of the three-dimensional article, applying a powder layer on a support structure; an executable portion configured for moving a support structure in z-direction at a predetermined speed and rotating the support structure about a z-axis at a predetermined speed; and an executable portion configured for directing a first energy beam from a first energy beam source at a first selected location of the powder layer and a second energy beam from a second energy beam source at a second selected location, the first and second energy beam sources being at least one of an electromagnetic energy beam source or a charged particle beam source, causing the powder layer to fuse in the first and second selected locations according to the model to form a first and second portions of the three-dimensional article. At least one of the executable portions is further configured such that: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, the powder layer is fully covered by the first and second cover areas, and a trajectory of the first cover area and a trajectory of the second cover area are at least in part overlapping each other when the support structure is rotated a full lap.

Also provided according to various embodiments is an apparatus for forming a three-dimensional article through successive fusion of parts of a powder bed, which parts corresponds to successive cross sections of the three-dimensional article, the apparatus comprising: a control unit having stored thereon a computer model of the three-dimensional article; a support structure movable in a z-direction at a predetermined speed and rotatable about a z-axis at a predetermined speed, a powder layer applicator for applying a powder layer on the support structure, and first and second energy beam sources arranged for at least one of heating or fusing the powder layer at first and second selected locations respectively according to the model to form first and second portions of the three-dimensional article, wherein: a first portion of the powder layer is applied simultaneous with a fusing of a second portion of the powder layer, a first cover area of the first energy beam on the powder layer is arranged at a predetermined minimum distance from and non-overlapping with a second cover area of the second energy beam on the powder layer, the first and second cover areas are each respectively smaller than an area of the support structure, the powder layer is fully covered by the first and second cover areas, and a trajectory of the first cover area and a trajectory of the second cover area are at least in part overlapping each other when the support structure is rotated a full lap.

Herein and throughout, where an exemplary embodiment is described or an advantage thereof is identified, such are considered and intended as exemplary and non-limiting in nature, so as to not otherwise limit or constrain the scope and nature of the inventive concepts disclosed.

BRIEF DESCRIPTION OF THE SEVERAL
VIEWS OF THE DRAWING(S)

The invention will be further described in the following, in a non-limiting way with reference to the accompanying drawings. Same characters of reference are employed to indicate corresponding similar parts throughout the several figures of the drawings:

FIG. 1 presents an apparatus according to various embodiments of the present invention;

DETAILED DESCRIPTION OF VARIOUS EMBODIMENTS

Figure 1:
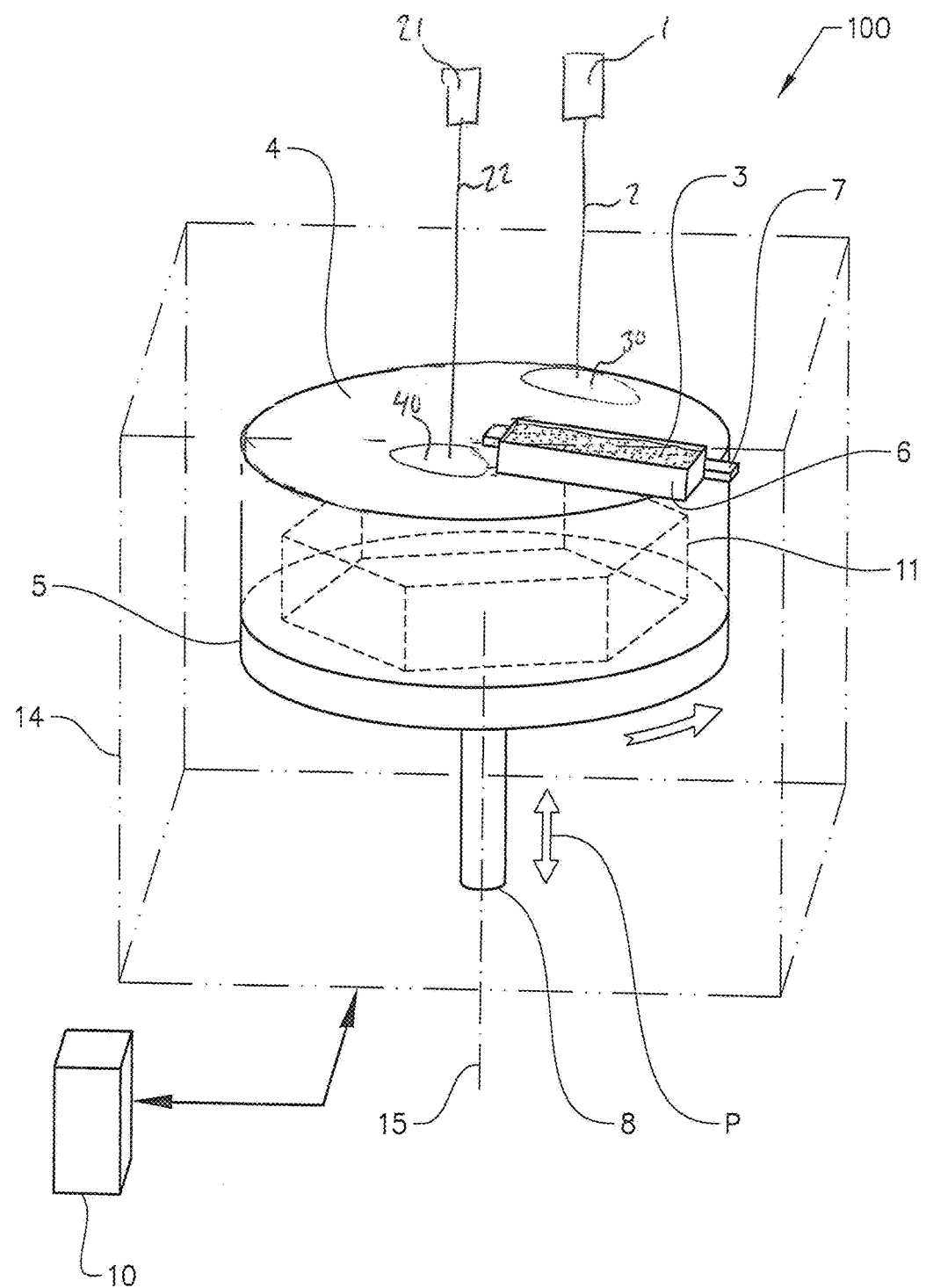

Various example embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "two-dimensional structures" and the like as used herein refer generally to substantially planar structures that may be considered as respective "layers" that when taken as a whole define or otherwise form the "three-dimensional structures" defined above. While referred to as "two-dimensional structures" it should be understood that each includes an accompanying thickness in a third dimension, albeit such that the structures remain substantially two-dimensional in nature. As a non-limiting example, a plurality of two-dimensional structures would have to be stacked atop one another so as to achieve a thickness comparable to that of the "three-dimensional structures" defined above and described elsewhere herein.

The term "electron beam" as used herein in various embodiments refers to any charged particle beam. The sources of a charged particle beam can include an electron gun, a linear accelerator and so on.

Various embodiments of the invention relate to a method for producing three-dimensional objects by powder additive manufacturing, for instance Electron Beam Melting (EBM) and/or selective laser sintering SLS or selective laser melting SLM. In various example embodiments the object may be wider than the sum of the beam scanning area from the energy beam sources.

FIG. 1 presents an example embodiment of an apparatus according to various embodiments of the present invention.

A first electron beam source 1 and a second electron beam source 21 may be used so that a first electron beam 2 and a second electron beam 22 define a 2D pattern in a thin bed of metal powder material 3 leveled by rake 7. The rake 7 may be movable or stationary. A powder storage 6 is providing the metal powder material 3 onto the work plate 5. In an example embodiment the powder storage 6 is provided stationary at a predetermined distance over the work-plate or previously applied powder layer. At the bottom of the powder storage 6 it may be provided a slit through which the powder is fed onto the work table or previously applied powder layer. A powder bed 4 may in an example embodiment measure a diameter 1500 mm in a plan view and a work plate 5 can be lowered 200-1000 mm by a mechanism elevator 8. Thus parts up to Ø1500×1000 mm can be manufactured in such equipment. It should be understood that these are not fundamental limits however. Using more than two electron beam sources may increase the diameter in increments of N×750 mm where N is the number of electron beam sources. 750 mm is not an absolute number since it depends on the geometry and/or the available electron beam power.

Sliced files are widely used for additive manufacturing applications and can be generated using digital data, such as any suitable solid computer aided design ("CAD") model. The sliced layers may consist of successive cross sections taken at ascending Z-intervals, where each slice is taken parallel to the XY plane.

To allow additive manufacturing to be conducted in a continuous way, a continuous computer description of a 3D object may be used. Such continuous description may eliminate one dimension, thus allowing association of an angular position to the object's boundaries along a radial line.

A possible application of this invention may consist in adjusting dynamically the position of a printer head—or a beam spot—along a radial line to melt the 3D object between the 1D segments described in this mathematical representation. With an appropriate system coordinate change, each interior and exterior boundary polyline from the solid material can advantageously be described in the two dimensional coordinate system (r,α) as follows:

$$r = \sqrt{x^2 + y^2}\,;\, \alpha = \left(\frac{2\pi}{z}\right)*H$$

where (x,y,z) are the Cartesian coordinates, r is a radial coordinate (distance to Z axis) and α is an angular coordinate [rad]. α is positive if measured counter clockwise as seen from any point with positive height. H is the height of the three-dimensional article which is to be built.

The invention is not limited to fusing or preheating the powder layer along radial lines. The preheating and melting of the powder layer may be performed in any direction within the maximum beam scanning area of the respective electron beam.

According to an example embodiment a mathematical model may be generated from a helical like cutting of a three-dimensional article. This slicing method requires defining a rotation axis along for instance Z (longitudinal), denoted by 15 in FIG. 1, and an origin angular position.

A file containing all r coordinates (intersecting the line that rotates uniformly around the axis) can be generated for each angular coordinate a with a step size chose in accordance to the accuracy needed.

FIG. 1 discloses only two electron beam sources 1, 21 for sake of simplicity. Of course, any number of beam sources may be used.

In the embodiment of this invention illustrated in FIG. 1, the work plate 5 can be moved in a process chamber 14. A continuous cutting model (continuous slicing) of the article to build may be generated and stored in the control unit 10. The work plate 5 may optionally be preheated to an adequate start temperature, wherein energy deposition on the work plate 5 during preheating may be done either during an incremental or continuous movement of the work plate 5. A moving feeding member is depositing a quantity of powder in the melting chamber to form a layer of powders with a regular and substantially uniform thickness, which may be done, as a non-limiting example, by a fixed powder layering device while the work plate 5 is moving.

An optional preheating of the powder layer to a temperature below the melting point of the powders may be performed, whereby the energy may be transmitted to the powders either during an incremental or continuous work plate 5 movement, wherein it must be noted that as a function of the temperature loss during one rotation, it is possible to arrange a reheat area before the powder come again to the beam scan area, Performing the melting by scanning with a focused beam in the area corresponding to a portion of the continuous cutting of the article according to the model stored in the control unit 10.

The optional preheating of the start plate, the powder application, the optional preheating of the powder layer, the fusion/melting of the powder layer occurs either as the work plate 5 rotates continuously or step wise until reaching the top definition of the article. The work plate 5 is lowered as the build progress, each revolution a distance ranging for instance between 20 to 200 µm equal to the thickness of the completed layer.

The vacuum chamber is configured for maintaining a vacuum environment by means of or via a vacuum system, which system may comprise a turbo molecular pump, a scroll pump, an ion pump and one or more valves which are well known to a skilled person in the art and therefore need no further explanation in this context. The vacuum system may be controlled by the control unit 10. In another embodiment the work plate may be provided in an enclosable chamber provided with ambient air and atmosphere pressure. In still another example embodiment the work plate may be provided in open air.

Various embodiments of this invention concern the provision of a rotation axis to the work plate 5 aligned or non-aligned with the center line of the energy beam. In an example embodiment of the present invention the axis of rotation 15 may be vertical and the work plate 5 may be annular. This rotation can be done intermittently or continuously together with the work plate 5 lowering continuously as the build progress.

The build tank may be in constant rotation. The work plate z-level may be positioned with a rod with an external thread which may be positioned by rotating inside an inside thread. The inside thread is geared to the rotation of the build tank. In this way a pitch of the threads can be the same and the layer height (the z-level to lower each full lapse of the build tank) adjusted by the gear mechanism (e.g. the internal thread rotates with a speed relation to the build tank). The gear mechanism may allow for any movement (up, down or still).

The build tank rotation may be applied from its outside. The tank may be stabilized by ball bearings and the applied rotational force is small since its inertia is large.

The build tank and build platform may be continuously measured and feedback to the beam control unit, in real time, which may translate the beam to adjust for a small dislocation of the build platform.

In this manner, in the case of a plurality of energy beams each being non-aligned with the rotational axis 15, the build envelope can be much wider than the sum of the beam scan areas in a powder bed plan. It is obvious that the work plate 5 lowering range remain identical to standard equipment. It is entirely conceivable that the build envelope in vertical direction will be designed to extend the maximum build height up to approximately 1000 mm.

As illustrated in FIG. 1, a three-dimensional object 11, in a rotational movement around an axis 15, is melted by the first electron beam 2 having a first maximum beam scan area 30 and a second electron beam 22 having a maximum beam scan area 40. The beam movement is coordinated with the rotational movement by the control unit 10. In an embodiment the melting strategy may allow for changing the revolution speed during the revolution of the work plate 5. Disturbances like shakings may be monitored and compensated for during the fusing of the powder layer.

The process may be particularly suitable to be applied to produce principally large parts, although not exclusively, turbine cases or large aerospace structural frames with a central hole. The present invention may be used for manufacturing one continuous object wider than the beam scanning area, it must be understood that the principles of the present invention can be applied equally to the production of several objects included into the build envelope.

It must be understood that the present invention is potentially applicable to any type of layer wise rapid prototyping and additive manufacturing machines, and to other machines using the layer-on-layer fabrication technique, including non-metallic material.

The electron beam sources 1, 21 generating electron beams 2, 22, are used for melting or fusing together powder material 3 provided on the work plate 5. The control unit 10 may be used for controlling and managing the electron beams 2, 22 emitted from the electron beam sources 1, 21. The electron beams 2, 22 may be deflected between its first extreme position and its second extreme position. The first electron beam source may have a first and second extreme positions, which are separated by a first distance and the second electron beam source may have a first and second extreme positions which are separated by a second distance. The first and second distance may be equal or different to each other. The first and second distances are not overlapping each other.

At least one focusing coil (not shown), at least one deflection coil (not shown) and an electron beam power supply (not shown) may be electrically connected to the control unit 10. A beam deflection unit (not shown) may comprise the at least one focusing coil, the at least one deflection coil and optionally at least one astigmatism coil. In an example embodiment of the invention the electron beam sources 1, 21 may generate a focusable electron beam with an accelerating voltage of about 60 kV and with a beam power in the range of 0-3 kW. The first and second electron beam sources may have equal power or different power. The pressure in the vacuum chamber may be in the range of $1 \times 10^{-3}$-$1 \times 10^{-6}$ mBar when building the three-dimensional article by fusing the powder layer by layer with the energy beam source 1.

The powder storage 6 may comprise the metal powder material 3 to be provided on the work plate 5. The metal powder material may for instance be pure metals or metal alloys such as titanium, titanium alloys, aluminum, aluminum alloys, stainless steel, Co—Cr—W alloy, Ni-based alloys, Titanium aluminides, Niobium, silicon nitride, molybdenum disilicide and the like.

The powder distributor or powder feeding member 7 may be arranged to lay down a thin layer of the powder material on the work plate 5. During manufacturing of the three-dimensional article the work plate 5 will be continuously lowered and rotated in relation to the energy beam sources 1, 21. In order to make this movement possible, the work plate 5 may in one embodiment of the invention be arranged movably in vertical direction, i.e., in the direction indicated by arrow P. This means that the work plate 5 may start in an initial position, and continuously rotate around an axis 15 and move vertically along the axis 15. The work plate 5 may continuously be lowered and rotated while simultaneously providing new powder material for the formation of new cross sectional portions of the three-dimensional article. Means for lowering the work plate 5 may for instance be through a servo engine equipped with a gear, adjusting screws, and the like. The rotation may be performed with an electrical motor.

Figure 2:
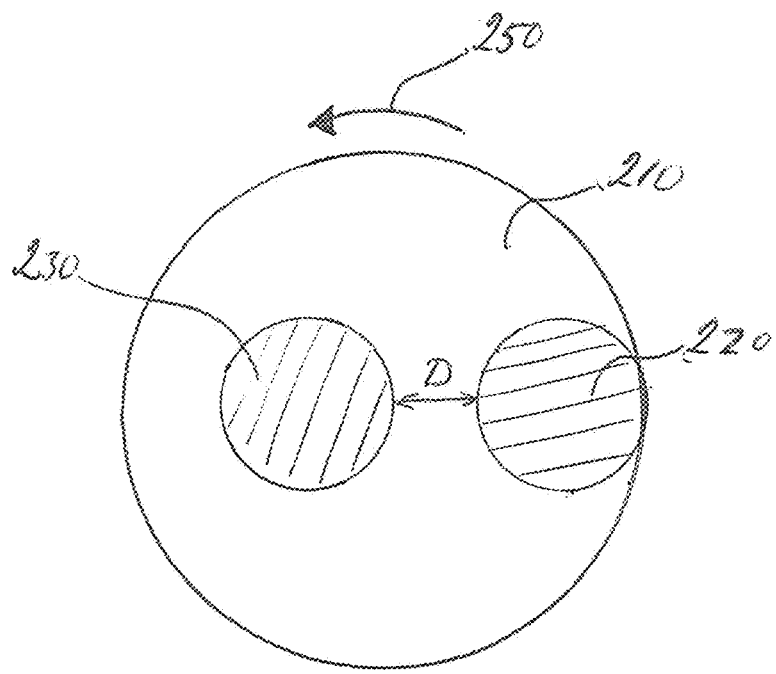
FIG. 2 shows a frozen top view picture of a rotating work table 210 in various embodiments of the present invention indicating the maximum beam scanning areas for two electron beams.

FIG. 2 shows a frozen top view picture of a rotating work table 210 in the present invention indicating the maximum beam scanning areas or cover areas for two energy beams. The rotation of the work table 210 is indicated by arrow 250. A first maximum beam scanning area 220 for the first energy beam 2 is separated by a distance D from the second maximum beam scanning area 230 for the second energy beam 22.

Figure 3A:
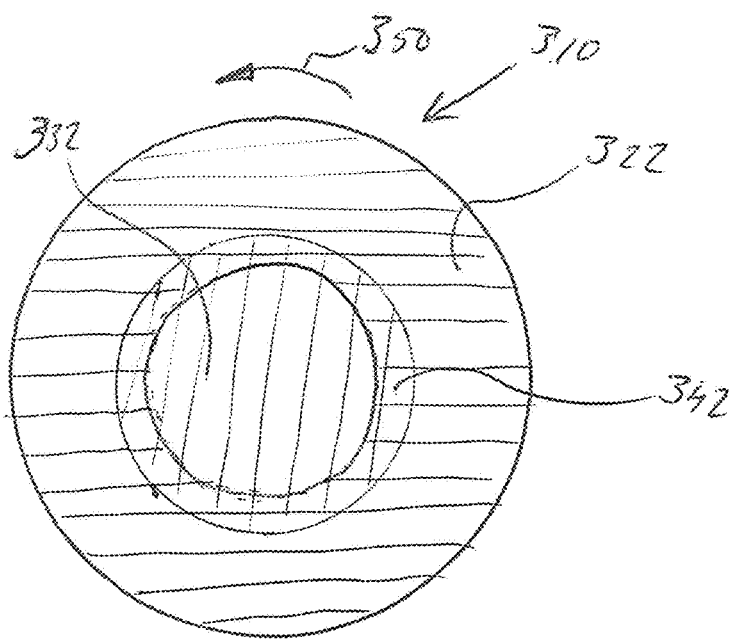
FIGS. 3A-3C show respective top views of a work table in various embodiments of the present invention where trajectories of the first and second beam scanning areas are denoted for a full lap of rotation of the work table.

FIG. 3A shows a top view of a rotating work table 310 in various embodiments of the present invention indicating the trajectories of the maximum beam scanning areas for two electron beams for a full lap of rotation of the work table 310. The rotation of the work table 310 is indicated by arrow 350 in FIG. 3A. A trajectory of the first cover area and a trajectory of the second cover area are overlapping each other when the support structure has rotated a full lap, i.e., an outer ring 322 represents the trajectory of the first maximum beam scanning area 220 after a full lap of the work table and an inner circle 332 represents the trajectory of the second maximum beam scanning area 230 after a full lap of the work table.

After a full lap of rotation of the work table 310 the first and second maximum beam scanning area may be covering the complete work table. The first maximum beam scanning area 220 is covering an outer ring 322 of the work table and the second maximum beam scanning area 230 is covering an inner circle 332 after a full lap of rotation. The outer ring and the inner circle may be overlapping each other in an overlap region 342. The overlap region 342 may be chosen to vary depending on the material to be fused, which layer is to be fused, the powder of the first end second electron beam sources and/or the size of the work table. The overlap may vary from one layer to another within a single three-dimensional article. The position of the overlap region may be shifted from one layer to another by increasing the beam scanning area of for one electron beam and decease the beam scanning are for another electron beam. Alternatively the overlap may be shifted by shifting the physical position of the electron beam sources and/or the position of the electron beam filament. The distance D between the first and second maximum beam scanning areas may be set to be as large as possible for minimizing the influence of one electron beam or electron beam source on the other electron beam or electron beam source.

Figure 3B:
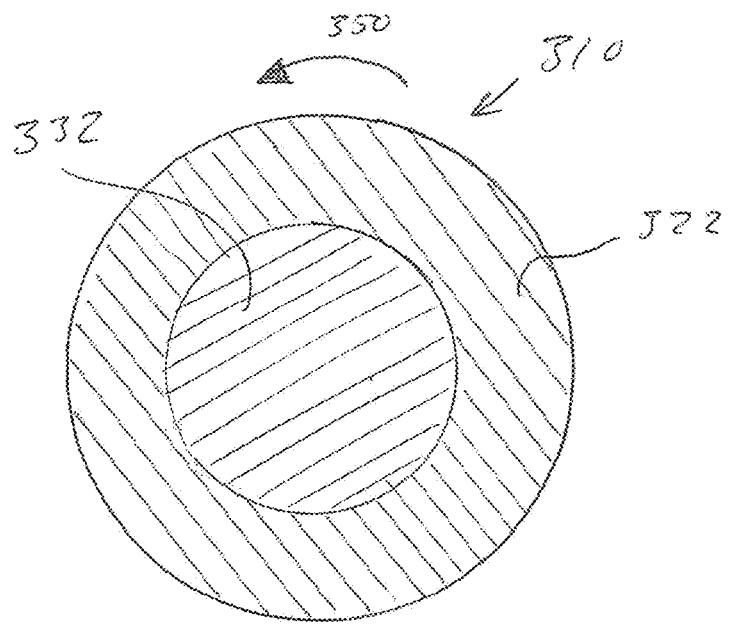
Figure 3C:
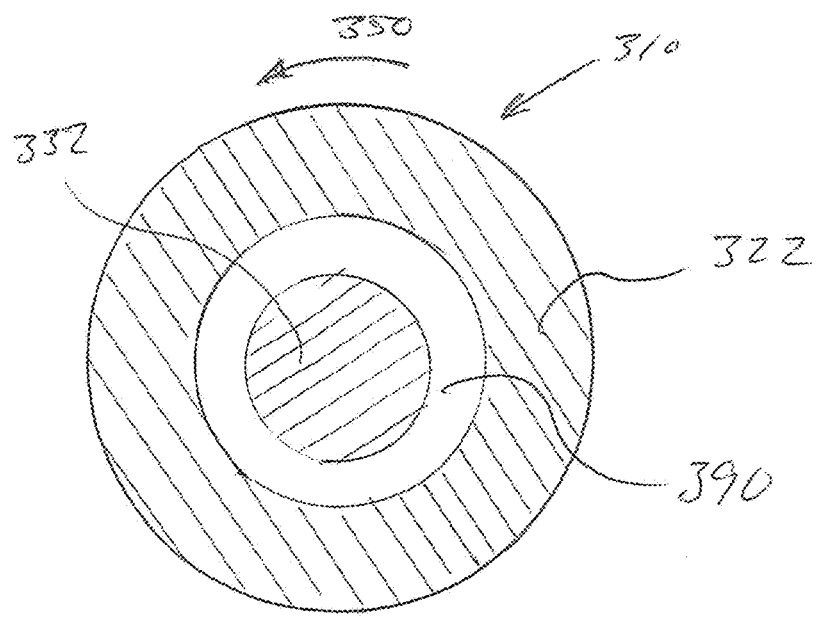

In another example embodiment depicted in FIG. 3C there is no overlap region of the inner circle 332 and the outer ring 322. In this embodiment there is an empty region 390 between the inner circle 332 and the outer ring 322. In this empty region 390 no fusion is taking place.

In still another example embodiment depicted in FIG. 3B the inner circle 332 and the outer ring are abutting without overlapping each other throughout the full lap of rotation of the work table.

In an example embodiment the inner circle 332 and the outer ring 322 may cover the full or just a portion of the work table. The outer ring 322 may have a smaller outer radius than the radius of the work table.

In an example embodiment the first and second electron beam sources are switched on and off synchronous with each other so that when the first electron beam is on the second electron beam source is off and vice versa. The time duration of the beam flashes may be in the range of us or shorter. The scan direction of the first electron beam may be different to the scan direction of the second electron beam. The scan direction may vary from one layer to another for an individual electron beam. The scan direction may also vary from one position to another within a single layer of a three-dimensional article for the one and/or the second electron beam. In embodiments having more than two electron beams one may choose to set one or more of them in an on state and the remaining in the off state depending on how far the electron beam are from each other. This means that different number of electron beams may be set in an on state from one moment to another within a single layer of the three dimensional article. The on and off switching scheme may be determined beforehand so that one knows that individual electron beam affect other electron beams as little as possible.

Figure 4:
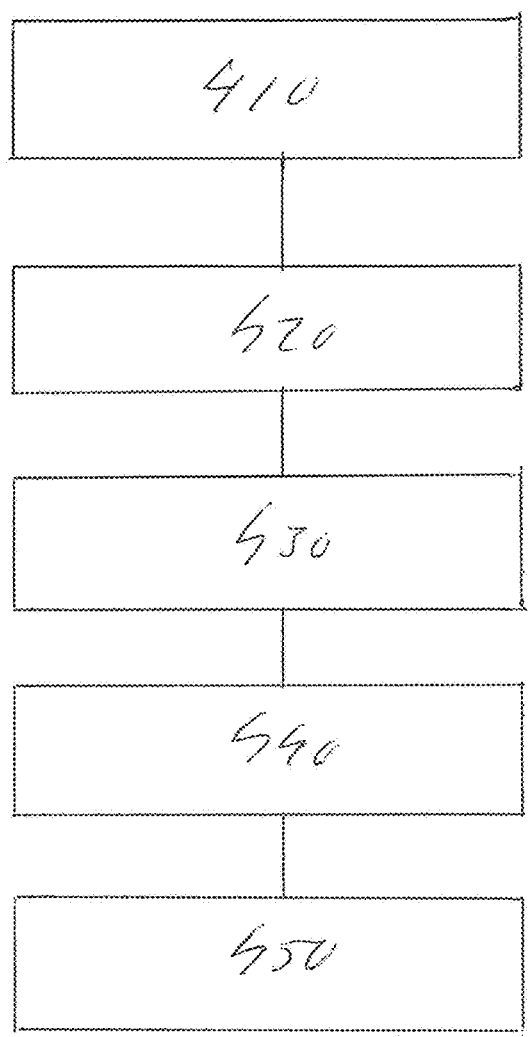
FIG. 4 shows a schematic flow chart according to various embodiments of the present invention.

In FIG. 4 it is depicted a flow chart of an example embodiment of a method according to the present invention.

The method comprising a first step 410 of providing at least one model of the three-dimensional article. The models may be a computer model generated via a CAD (Computer Aided Design) tool. The three-dimensional articles which are to be built may be equal or different to each other.

In a second step 420 a support structure like a work plate 5 is moved in z-direction at a predetermined speed while rotating the support structure at a predetermined speed. This simultaneous z-movement and rotation of the work plate will result in a helical movement. The z-movement and/or the rotational movement may be a continuous or a stepwise movement.

In a third step 430 a first powder layer is applied on a support structure. The support structure may be a work plate 5. The work plate 5 may be a removable or fixed build platform, a powder bed, a partially fused powder bed or a pre-manufactured part. The powder may be distributed evenly over the work plate 5 according to several methods. One way to distribute the powder 3 is to let the powder material 3 in the powder supply 6 falling down onto the work plate 5. The powder supply may have an opening at its bottom facing the work plate 5, through which the powder may fall down to the work plate 5. A feeding member or rake 7 may ensure the powder material onto the work plate is provided uniformly to an essentially flat surface. The rake may be arranged stationary or movable.

A distance between a lower part of the rake 7 and the upper part of the work plate 5 or previous powder layer may determine the thickness of powder distributed over the work plate 5. The powder layer thickness can easily be adjusted by adjusting the distance between the lower part of the rake and the previous layer or the work plate 5.

In a fourth step 440 directing a first electron beam from a first electron beam source at a first selected location of the powder layer and a second electron beam from a second electron beam source at a second selected location, the first and second electron beam sources causing the powder layer to fuse in the first and second selected locations according to the model to form a first and second portions of the three-dimensional article.

The first and second electron beams may fuse the three-dimensional article with parallel scan lines so as to form a fusion zone extending in a direction perpendicular to an axis of rotation of the work plate 5.

The first and second electron beams may be directed over the work plate 5 from instructions given by the control unit 10. In the control unit 10 instructions for how to control the first and second electron beam sources 1, 21 for each portions of the three-dimensional article may be stored.

By using a plurality of beam sources the build temperature of the three-dimensional build may more easily be maintained compared to if just one beam source is used. The reason for this is that two beam may be at more locations simultaneously than just one beam. Increasing the number of beam sources will further ease the control of the build temperature. By using a plurality of energy beam sources a first energy beam source may be used for melting the powder material and a second energy beam source may be used for heating the powder material in order to keep the build temperature within a predetermined temperature range.

In a fifth step 450 providing a first portion of the powder layer simultaneous as fusing a second portion of the powder layer, wherein a first cover area, being smaller than an area of the support structure, of the first electron beam on the powder layer is arranged at a predetermined minimum distance and non-overlapping from a second cover area, being smaller than an area of the support structure, of the second electron beam on the powder layer so that so that a trajectory of the first cover area and a trajectory of the second cover area are at least one of overlapping each other, abutting each other or separated to each other when the support structure is rotated a full lap.

According to the invention the powder application and fusion takes place simultaneously. The powder is applied at a first portion of the work table 5 while the fusion is taken place on a second portion of the work table 5. The fusion may in various example embodiments take place along a line perpendicular to the rotational axis of the work plate 5. One example embodiment of a three dimensional article which is manufactured according to this invention where the fusion take place along a line perpendicular to the rotational axis In another aspect of the invention it is provided a program element configured and arranged when executed on a computer to implement a method for forming at least one three-dimensional article through successive fusion of parts of a powder bed, which parts correspond to successive portions of the three-dimensional article. The program element may be installed in a computer readable storage medium. The computer readable storage medium may be the control unit 10 or another and separate control unit, as may be desirable. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
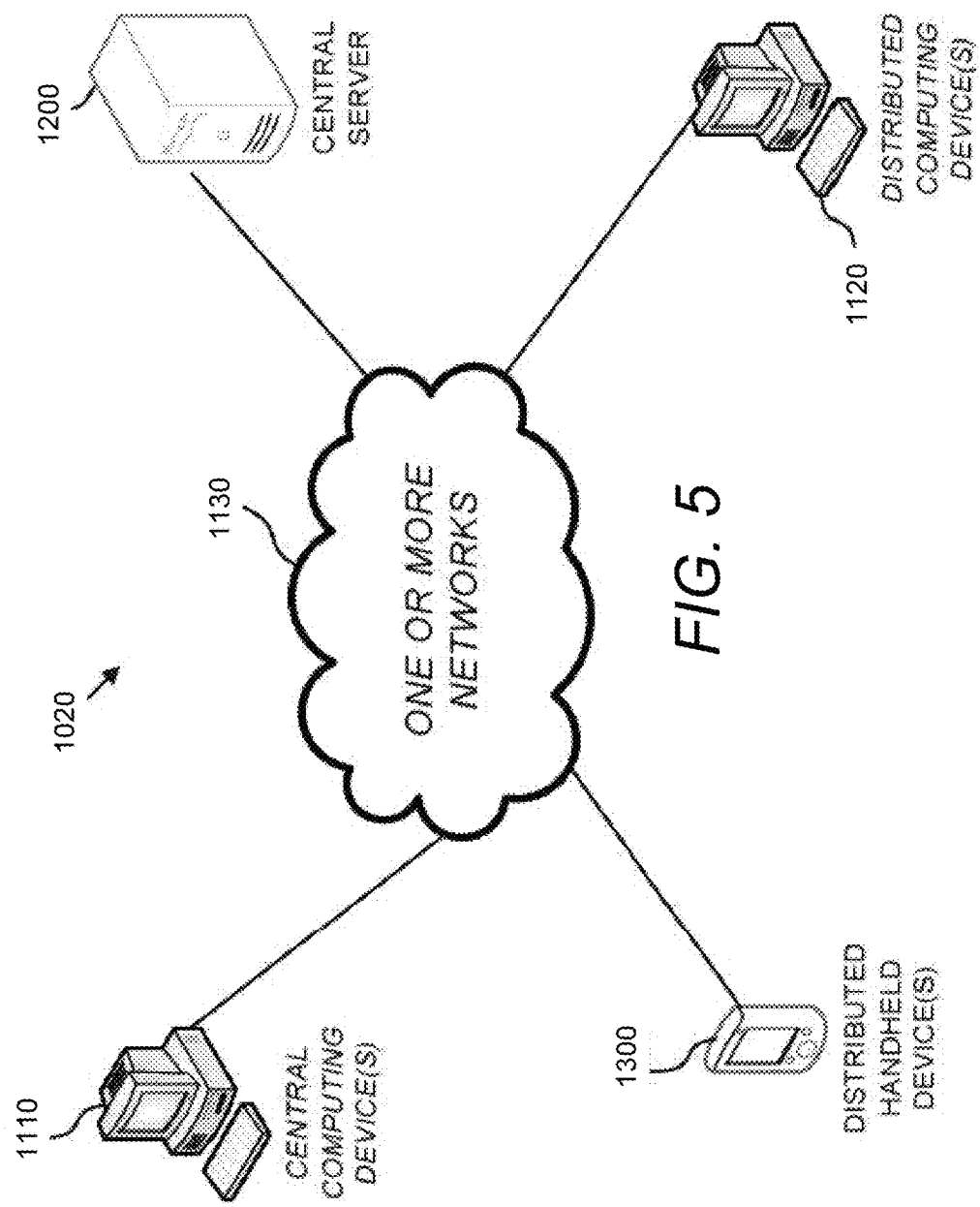
FIG. 5 is a block diagram of an exemplary system 1020 according to various embodiments.

FIG. 5 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™ infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6A:
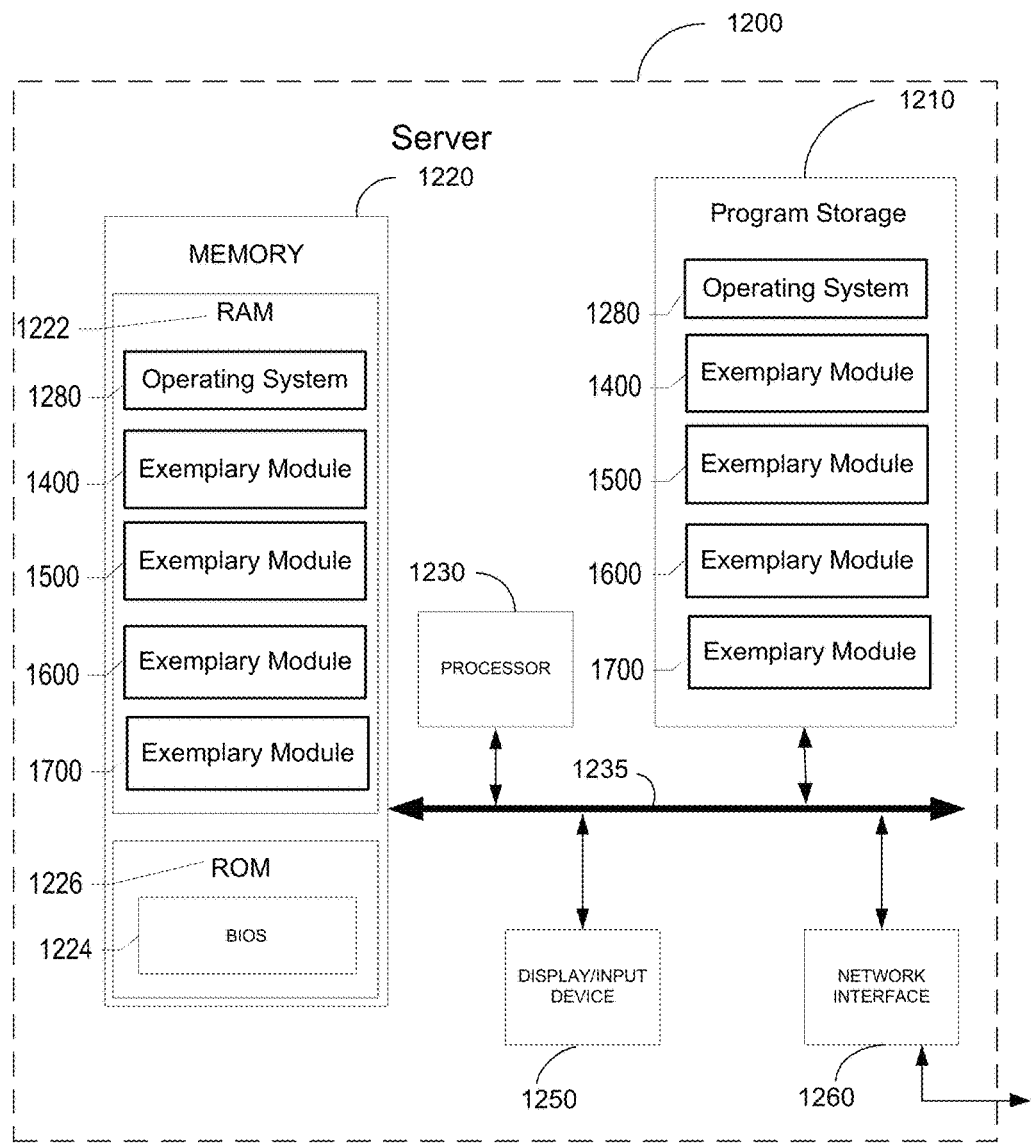
FIG. 6A is a schematic block diagram of a server 1200 according to various embodiments.

FIG. 6A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 6B:
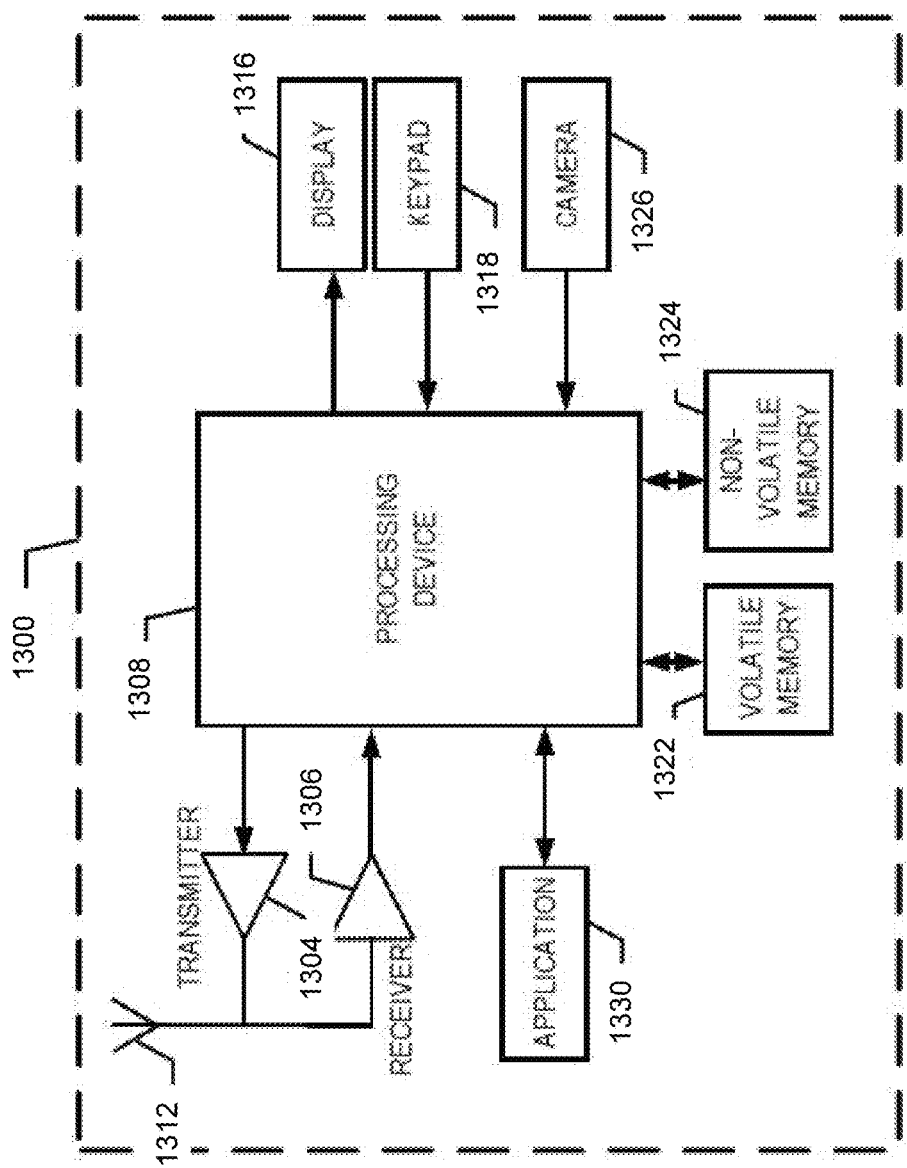
FIG. 6B is a schematic block diagram of an exemplary mobile device 1300 according to various embodiments.

FIG. 6B provides an illustrative schematic representative of a mobile device 1300 that can be used in conjunction with various embodiments of the present invention. Mobile devices 1300 can be operated by various parties. As shown in FIG. 6B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Such modifications may, for example, involve using a different numbers of energy beam sources than the exemplified two energy beam sources. There may be a mixture between different kinds of energy beam sources such as laser beam sources and electron beam sources. In various example embodiments only a plurality of laser beam sources are used. Other electrically conductive materials than pure metallic powder may be used such as electrically conductive powders of polymers and electrically conductive powder of ceramics. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for forming at least one three-dimensional article through successive fusion of parts of a powder bed, which parts correspond to successive portions of the three-dimensional article, said method comprising the steps of:
    moving a support structure in a Z-direction at a predetermined speed while also rotating said support structure about a Z-axis at a predetermined speed,
    applying a powder layer on said support structure, and
    directing a first energy beam from a first energy beam source at a first selected location of said powder layer and a second energy beam from a second energy beam source at a second selected location, said first and second energy beam sources causing said powder layer to fuse in said first and second selected locations to form respective first and second portions of said three-dimensional article,
    wherein:
    a first portion of said powder layer is applied simultaneous with a fusing of a second portion of said powder layer, a first cover area of said first energy beam on said powder layer is arranged at a predetermined distance from a second cover area of said second energy beam on said powder layer, the first and second cover areas are non-overlapping with each other, the first and second cover areas are each respectively smaller than an area of said support structure, and a trajectory of said first cover area and a trajectory of said second cover area are at least one of overlapping each other, abutting each other, or separated relative to each other when said support structure is rotated a full lap.

2. The method according to claim 1, wherein said predetermined distance is at least half a maximum scan length of at least one of said first or said second energy beam on said powder layer.

3. The method according to claim 1, wherein:
at least one of said first and second beams is scanning along a line perpendicular to the rotational axis of said support structure; and
said line perpendicular to said rotational axis is at least one of a straight line or a meandering line.

4. The method according to claim 1, wherein one or more of:
said support structure is rotating at least one of clockwise or anticlockwise during the formation of the three-dimensional article;
said preheating is performed by using at least one of the energy sources used for fusing said powder layer;
said energy beam sources is at least one of a laser beam source and/or an electron beam source;
at least said steps of providing said first portion of said powder layer simultaneous as fusing said second portion of said powder layer occurs in a vacuum chamber;
beam movement is coordinated with said rotational movement via an associated control unit;
said first and second trajectories are covering a complete area of said support structure; or
a rotational axis of the model is coincidental with the rotational axis of the three-dimensional article built on said support structure.

5. The method according to claim 1, wherein said rotational axis of said support structure is along the Z-axis and said at least one beam is fusing in an X-Y plane.

6. The method according to claim 1, wherein said support structure is a horizontal plate.

7. The method according to claim 6, wherein at least one of said first or said second energy beams are provided off axis with respect to said rotational axis of said support structure.

8. The method according to claim 1, wherein said support structure is continuously moving in said Z-axis coordinate direction at a predetermined speed.

9. The method according to claim 1, wherein said powder layer is provided continuously on said support structure during the formation of said three-dimensional article.

10. The method according to claim 1, further comprising the step of preheating a third portion of said powder layer.

11. The method according to claim 10, wherein said preheating is performed by using an energy source not used for fusing said powder layer.

12. The method according to claim 1, wherein at least said steps of providing said first portion of said powder layer simultaneous as fusing said second portion of said powder layer occurs in a vacuum chamber.

13. The method according to claim 1, further comprising the step of switching said first and second electron beams on and off synchronously with each other so that when one of them is off the other one is on and vice versa.

14. The method according to claim 1, wherein said powder layer is fully covered by said first and second cover areas.

* * * * *